(12) United States Patent
Wada

(10) Patent No.: US 7,252,326 B2
(45) Date of Patent: Aug. 7, 2007

(54) VEHICLE UNDERBODY STRUCTURE

(75) Inventor: Koji Wada, Hadano (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/344,042

(22) Filed: Feb. 1, 2006

(65) Prior Publication Data

US 2006/0175872 A1 Aug. 10, 2006

(30) Foreign Application Priority Data

Feb. 4, 2005 (JP) ............................. 2005-028702

(51) Int. Cl.
  *B60J 7/00* (2006.01)
(52) U.S. Cl. .................. 296/204; 296/193.07
(58) Field of Classification Search ................ 295/204, 295/193.07, 193.08, 193.09, 30
  See application file for complete search history.

(56) References Cited

U.S. PATENT DOCUMENTS

| | | | | |
|---|---|---|---|---|
| 3,252,211 A | * | 5/1966 | Lindstrom | ............... 29/402.13 |
| 3,419,303 A | * | 12/1968 | Eggert, Jr. et al. | .......... 296/204 |
| 4,428,599 A | * | 1/1984 | Jahnle | ........................ 296/204 |
| 5,074,374 A | * | 12/1991 | Ohtake et al. | .............. 180/312 |
| 5,129,700 A | * | 7/1992 | Trevisan et al. | ............ 296/204 |
| 5,803,533 A | * | 9/1998 | Schulz et al. | ............... 296/204 |
| 6,073,991 A | * | 6/2000 | Naert | ..................... 296/193.07 |
| 6,619,730 B2 | * | 9/2003 | Porner | ........................ 296/204 |
| 6,688,676 B1 | * | 2/2004 | Sato | ...................... 296/187.05 |
| 6,843,524 B2 | * | 1/2005 | Kitagawa | ............... 296/187.09 |
| 6,981,736 B2 | * | 1/2006 | Morsch et al. | .............. 296/204 |
| 7,178,861 B2 | * | 2/2007 | Yamada et al. | ............. 296/204 |
| 2002/0033594 A1 | * | 3/2002 | Yamamoto et al. | ......... 280/781 |

FOREIGN PATENT DOCUMENTS

JP 10-331658 A 12/1998

* cited by examiner

*Primary Examiner*—Kiran B. Patel
(74) *Attorney, Agent, or Firm*—Foley & Lardner LLP

(57) ABSTRACT

A vehicle underbody structure including: a front floor panel; a rear floor panel having a portion raised above the front floor panel; side sills; tunnel members extending along a floor tunnel; and a reinforcing plate. The rear floor panel is provided with suspension mounting members to which a rear suspension frame are mounted. The reinforcing plate extends to the suspension mounting members, the side sills, and the tunnel members.

5 Claims, 3 Drawing Sheets

VEHICLE UNDERBODY STRUCTURE

BACKGROUND OF THE INVENTION

1. Field of the Invention

The present invention relates to an underbody structure of a vehicle such as an automobile.

2. Description of Related Art

In a vehicle underbody structure as disclosed in Japanese Patent Application Laid-Open Publication No. 10-331658, a rear floor panel is raised above a front floor panel to provide a fuel tank space therebeneath, and suspension frame mounting brackets are extended to the inside of the space or the proximity thereof to support a frame of the rear suspension system.

Each of the suspension frame mounting brackets extends horizontally rearward from a horizontal portion of a rear side member of the vehicle body. The rear end thereof reaches a position under an offset portion of the rear side member, which is formed to be offset upward to get around the rear suspension system and rear axles.

SUMMARY OF THE INVENTION

Upon turning of the vehicle, the vehicle body bears the load from the road in the transverse direction of the vehicle via the rear wheels and the rear suspension system. Especially the torsional force is applied to the suspension frame mounting brackets. In the aforementioned underbody structure, the suspension frame mounting bracket exhibits low rigidity against the torsional force due to the cantilevered configuration thereof having the base end portion thereof fixed to the rear side member while the rear end thereof unsupported on the vehicle body structure, and is easily displaced by the load. Accordingly the alignment of the rear suspension system changes, thus deteriorating the control stability of the vehicle body.

It is an object of the present invention to provide a vehicle underbody structure that improves the control stability of the vehicle, restraining the change in alignment of the rear suspension system.

An aspect of the present invention is a vehicle underbody structure comprising: a front floor panel; a rear floor panel having a portion raised above the front floor panel, the rear floor panel provided with a suspension mounting member to which a rear suspension frame is mounted; a side sill; a tunnel member extending along a floor tunnel; and a reinforcing plate extending to the suspension mounting member, the side sill, and the tunnel member.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
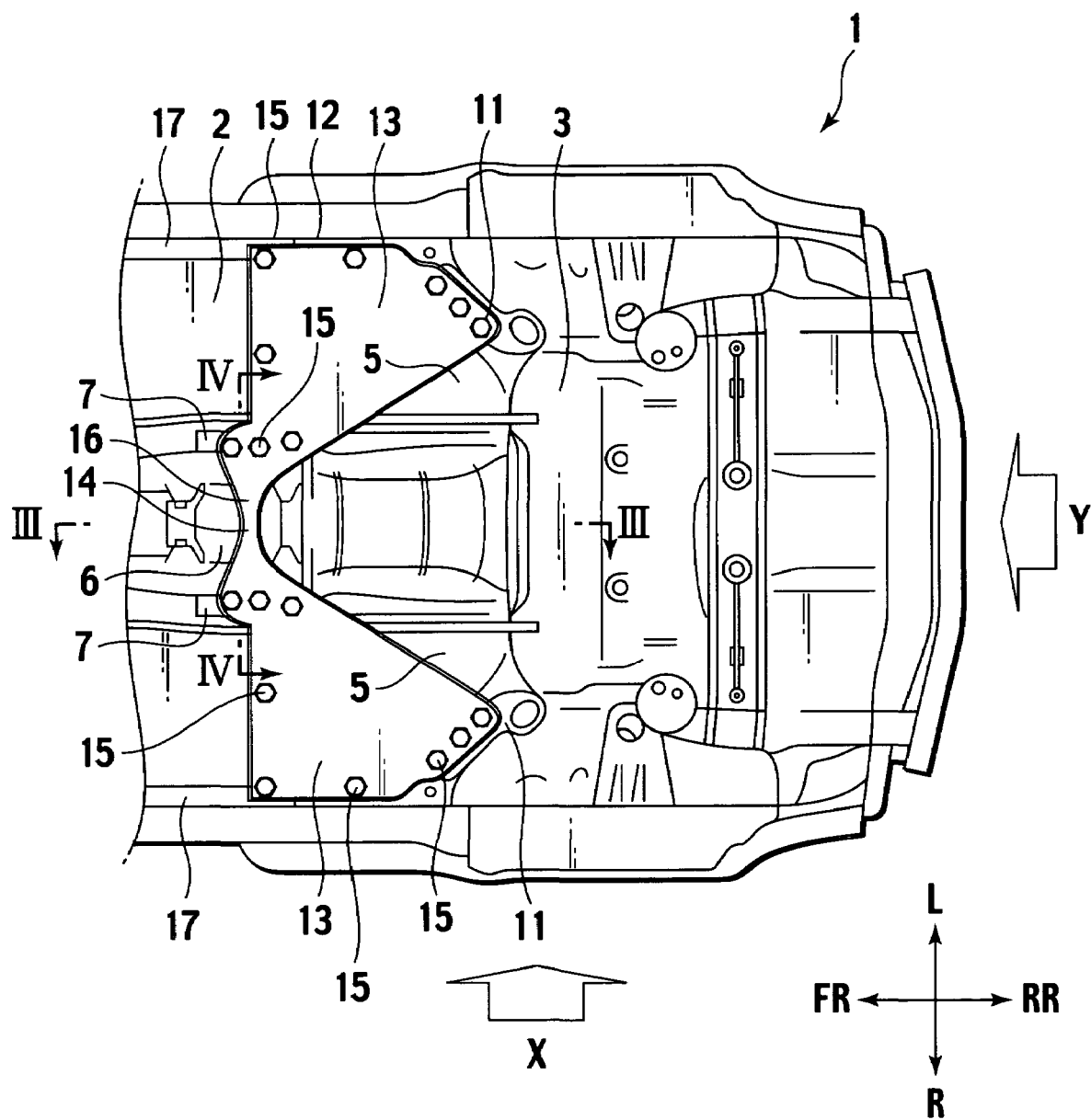
FIG. 1 is a bottom view of a vehicle having a vehicle underbody structure according to the present invention.

An embodiment of the present invention will be explained below with reference to the drawings, wherein like members are designated by like reference characters.

Figure 3:
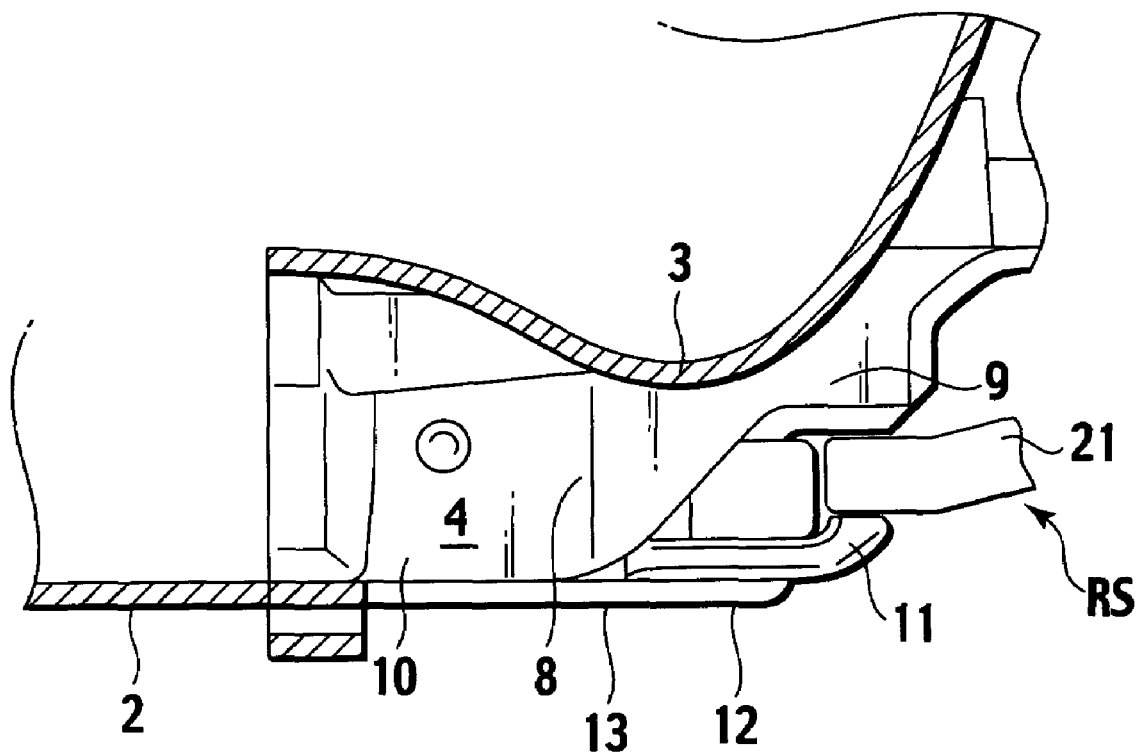
FIG. 3 is a cross sectional view taken along line III—III of FIG. 1, showing the vehicle underbody structure of FIG. 1 with a fuel tank removed.

Underbody structure of a vehicle body 1 includes a front floor panel 2 extending horizontally to a position under the rear seat, and a rear floor panel 3 extending rearward continuously from a rear edge of the front floor panel 2. The rear floor panel 3 is formed to have a raised portion positioned higher than the front floor panel 2. A space 4 formed below the raised portion of the rear floor panel 3 as shown in FIG. 3 accommodates therein a fuel tank 5. A floor tunnel 6 is formed at the center in the transverse direction of the vehicle of the front floor panel 2 and the rear floor panel 3, to extend in the longitudinal direction of the vehicle body 1. Two longitudinal structural members (hereinafter, referred to as tunnel members) 7 are provided along the floor tunnel 6 at transversely outer sides thereof, respectively.

As shown in FIG. 3, rear side members 8 are extended in the longitudinal direction of the vehicle body 1. Each of the rear side members 8 is formed to have a horizontal portion 10 extending in a substantially horizontal direction along the front floor panel 2 and an offset portion 9 extending rearward from the horizontal portion 10 and being offset upward to get around rear suspension system RS and the axle of the rear wheel.

Figure 2A:
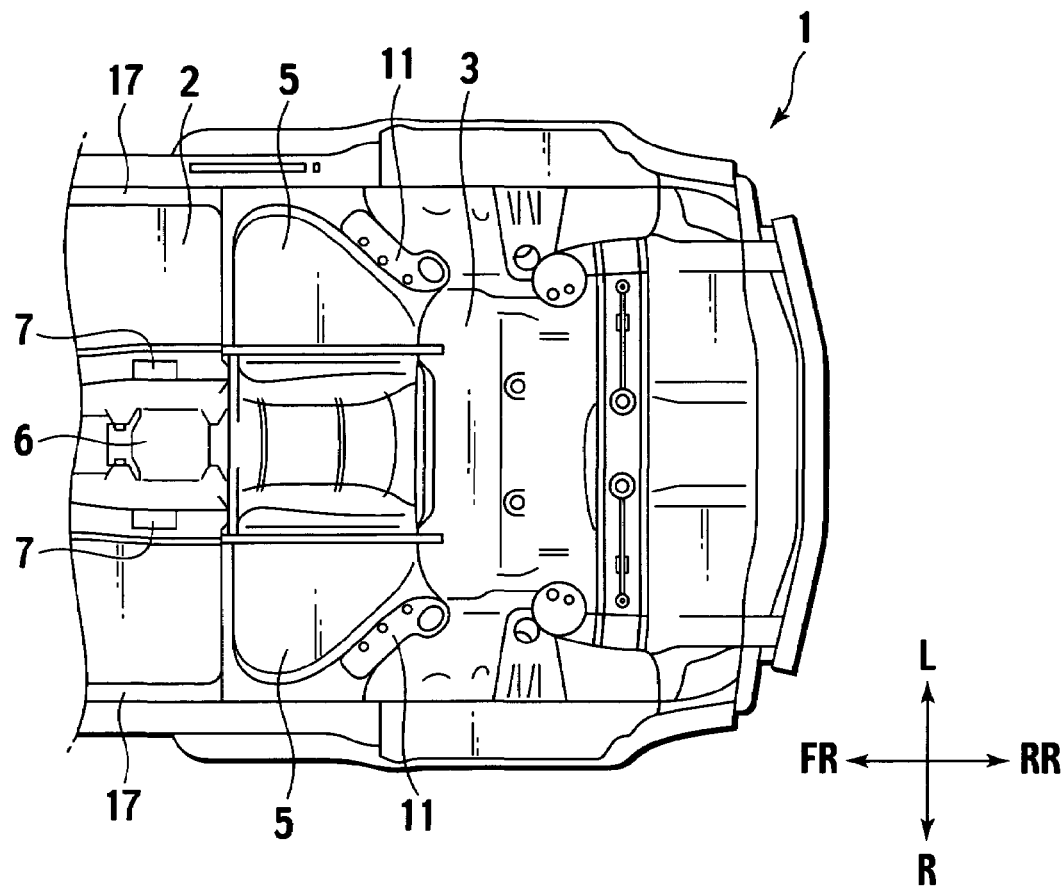
FIG. 2A is a bottom view of the vehicle of FIG. 1 with a reinforcing plate removed.
Figure 2B:
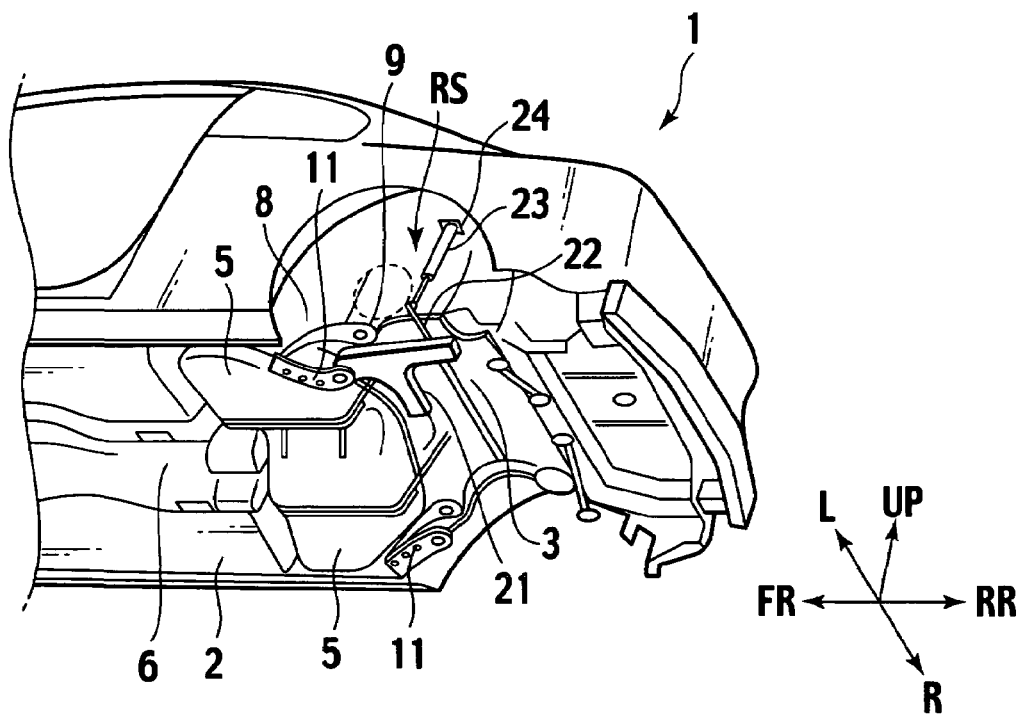
FIG. 2B is a bottom perspective view of the vehicle of FIG. 1 with the reinforcing plate removed.

As shown in FIG. 2B, the rear suspension system RS includes a rear suspension frame (subframe) 21, suspension links 22 swingably connected to a rear wheel hub and the rear suspension frame 21 at both ends thereof, shock absorbers 23 each connected at a lower end thereof to one of the suspension links 22. The rear suspension system RS is mounted onto the vehicle body 1, with the rear suspension frame 21 thereof mounted at two front ends thereof onto suspension frame mounting brackets (suspension mounting members) 11, each of which extends from the rear floor panel 3 into the space 4 below the rear floor panel 3 or the proximity thereof, and the offset portions 9.

The suspension frame mounting brackets 11 are provided to extend in the substantially horizontal direction from the respective rear portions of the horizontal portions 10 of the rear side members 8 to the rear of the vehicle body 1. Each of the suspension frame mounting brackets 11 extends to have a rear end thereof at the point below the offset portion 9 of the rear side member 8. Each of the vertically extending shock absorbers 23 is supported at its lower end on the suspension link 22 of the rear suspension system RS, the frame 21 of which is mounted on the suspension frame mounting brackets 11, and mounted at its upper end to the vehicle body 1 with a mounting member 24 interposed therebetween.

A reinforcing plate 12 is formed of a metal plate that exhibits high rigidity, which includes a pair of symmetrically provided fan-shaped flat plate portions 13, and a connecting portion 14 connecting those flat plate portions 13 at a central area of the reinforcing plate 12 in the transverse direction of the vehicle. The reinforcing plate 12 is attached to the vehicle body 1 so as to cover the bottom surface of the fuel tank 5 and the suspension frame mounting brackets 11. Specifically, each of the flat plate portions 13 of the reinforcing plate 12 has its rear portion extending to the suspension frame mounting bracket 11, its front portion extending to the rear edge of the front floor panel 2, and its transversely outer side portion extending to a side sill 17 of the vehicle body 1. Each of the flat plate portions 13 is fixed at its rear and transversely outer edge portion to the suspension frame mounting bracket 11, at its front edge portion to the rear edge of the front floor panel 2, and at its transversely outer side edge portion to the side sill 17, using bolts 15, respectively. Each of the flat plate portions 13 extends to the corresponding tunnel member 7 at the center of the vehicle and is fixed at the rear end thereof to the tunnel member, using the bolts 15. Each of the flat plate portions 13 is thus fixed to the vehicle body 1 at the entire peripheral portion thereof to cover the bottom surface of the fuel tank 5.

The height of the flat plate portions 13 of the reinforcing plate 12 becomes substantially the same as that of the front floor panel 2 upon its assembly. The reinforcing plate 12 is arranged such that its height becomes substantially the same as that of the front floor panel 2, with the flat plate portions 13 thereof extending in the substantially horizontal direction from the rear edge of the front floor panel 2 to the rear of the vehicle body 1 and in the substantially same plane as the front floor panel 2. The lower surfaces of the front floor panel 2 and the reinforcing plate 12 become flush with each other to form a flat smooth surface of the vehicle underbody.

Figure 4:
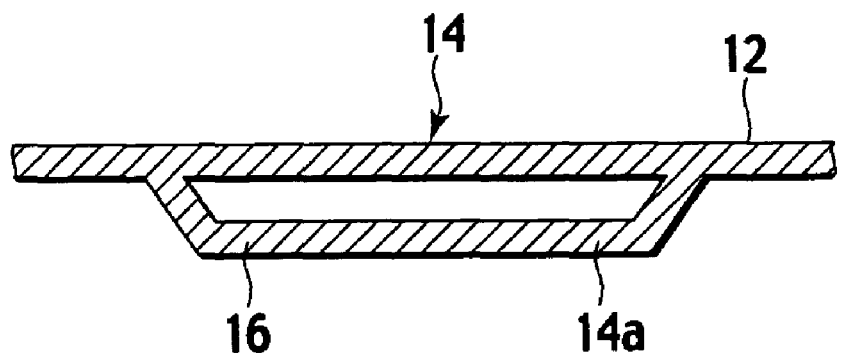
FIG. 4 is a cross sectional view taken along line IV—IV of FIG. 1, schematically showing a closed cross-section of the reinforcing plate.

The connecting portion 14 of the reinforcing plate 12 extends in the transverse direction of the vehicle to cross over the lower opening of the floor tunnel 6. As shown in FIG. 4, the connecting portion 14 has a hollow cross-section 16 that has a bottom plate 14a projected downward from the flat plate portion 13.

Referring to FIG. 1, upon turning of the vehicle, the load X is applied to the vehicle body 1 in the transverse direction thereof from the road via the rear wheels and the rear suspension system RS. Then, the torsional force is exerted onto the suspension frame mounting brackets 11. The high rigidity reinforcing plate 12 fixed to the front floor panel 2, the side sills 17 and the tunnel members 7 is fixed to the suspension frame mounting brackets 11. That is, the reinforcing plate 12 serves to connect the suspension frame mounting brackets 11 to the front floor panel 2, the side sills 17 and the tunnel members 7. Accordingly, the displacements of the suspension frame mounting brackets 11 due to the applied load X can be restrained. The amount of the change in alignment of the rear suspension system is effectively reduced, thus improving the control stability of the vehicle.

In the case where an impact load Y (see FIG. 1) is applied from the rear of the vehicle body 1 toward the front thereof due to the contact of the rear vehicle body with an obstacle, the resultant damage to the fuel tank 5 may be reduced with the deformation thereof restrained, since the reinforcing plate 12 covers the bottom surface of the fuel tank 5 to protect the fuel tank 5, and is fixed to the high rigidity structural members of the front floor panel 2, the side sills 17 and the tunnel members 7, thus increasing the number of load paths to distribute the impact load Y.

The reinforcing plate 12 is structured to extend in the substantially horizontal direction from the front floor panel 2 to the rear of the vehicle body 1, and the height of the flat plate portions 13 of the reinforcing plate 12 is substantially the same as that of the front floor panel 2. This makes it possible to reduce air resistance during traveling of the vehicle body 1 and to improve the aerodynamic characteristic thereof.

Further, the reinforcing plate 12 covers the bottom surface of the fuel tank 5 to protect it from chipping caused by road debris during traveling of the vehicle on the rough road.

The connecting portion 14 of the reinforcing plate 12 is provided to cross over the floor tunnel 6. The portion crossing over the tunnel 6 is formed to have the closed cross-section 16, whereby the strength and rigidity of the floor tunnel 6 is improved and deformation thereof due to the applied load is retrained.

The preferred embodiment described herein is illustrative and not restrictive, and the invention may be practiced or embodied in other ways without departing from the spirit or essential character thereof. In the embodiment described above, the reinforcing plate is provided to extend to the suspension frame mounting brackets, the front floor panel, the side sills, and the tunnel members. However, it may be structured such that the reinforcing plate is provided to extend from the suspension frame mounting brackets to the front floor panel, for example.

The scope of the invention being indicated by the claims, and all variations which come within the meaning of claims are intended to be embraced herein.

The present disclosure relates to subject matters contained in Japanese Patent Application No. 2005-028702, filed on Feb. 4, 2005, the disclosures of which is expressly incorporated herein by reference in its entirety.

What is claimed is:

1. A vehicle underbody structure comprising:
    a front floor panel;
    a rear floor panel having a portion raised above the front floor panel, the rear floor panel provided with a suspension mounting member to which a rear suspension frame is mounted;
    a side sill;
    a tunnel member extending along a floor tunnel; and
    a reinforcing plate extending to the suspension mounting member, the side sill, and the tunnel member.

2. The vehicle underbody structure according to claim 1, wherein the reinforcing plate is connected to the front floor panel.

3. The vehicle underbody structure according to claim 1, wherein the reinforcing plate extends rearward from the front floor panel in a substantially same plane as the front floor panel.

4. The vehicle underbody structure according to claim 1, wherein the reinforcing plate crosses over the floor tunnel, and a portion thereof crossing over the floor tunnel is formed to have a closed cross-section.

5. The vehicle underbody structure according to claim 1, wherein a fuel tank is disposed in a space between the rear floor panel and the reinforcing plate.

* * * * *